Nov. 18, 1930.  A. P. KELLER  1,782,236
CLAY MOLDING DIE
Filed July 25, 1929
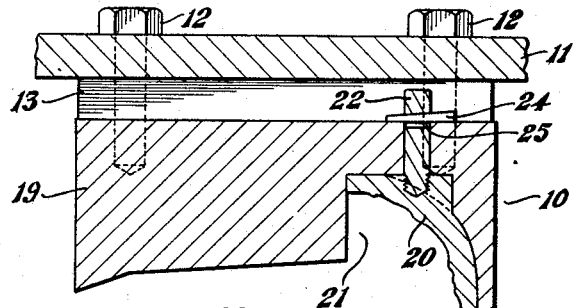
Fig. 1
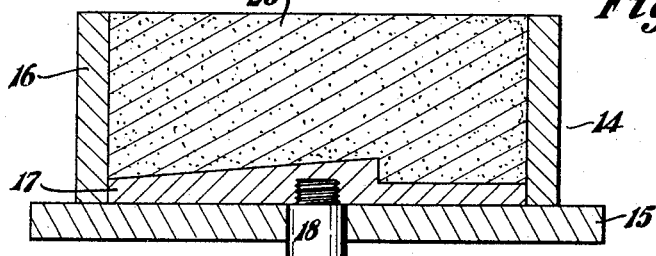
Fig. 2
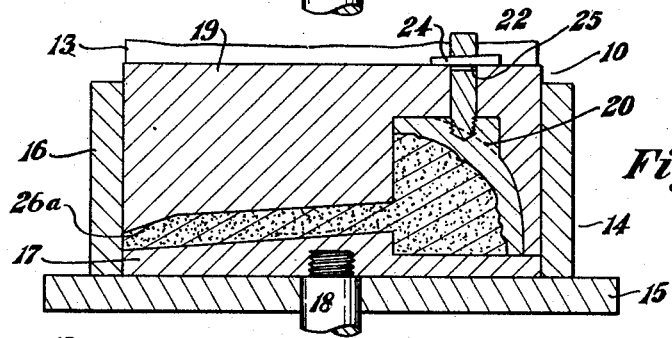
Fig. 3
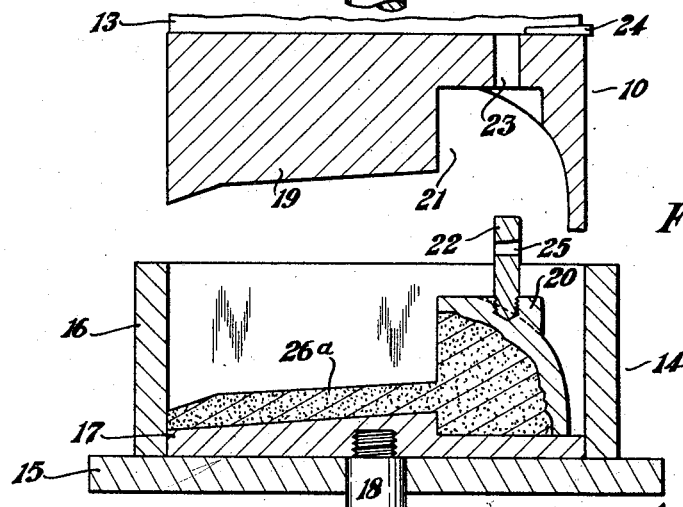
INVENTOR
A. P. Keller
BY Robert McPierson, ATTORNEY Patented Nov. 18, 1930

1,782,236

UNITED STATES PATENT OFFICE

ANDREW P. KELLER, OF TIFFIN, OHIO

CLAY-MOLDING DIE

Application filed July 25, 1929. Serial No. 380,877.

This invention relates to clay-pressing molds or dies and it has for its object to provide an improved die for molding pieces with embossed ornamentation thereon, from which a die-plate of the ordinary type cannot be withdrawn without disturbance of the embossing.

In molding certain pieces, such as backwalls for radiant gas heaters and work of a similar nature, where it is desired to mold the piece with an ornamental picture or design thereon having portions more or less undercut, no means has heretofore existed in the art, so far as I am aware, whereby the die-plate could be properly drawn from such an undercut design. It has therefore been necessary, at least partly, to execute the design by hand work after the piece is molded. My invention solves this problem in a simple and effective manner, and provides a die in which work of this character can be quickly and cheaply produced.

Of the accompanying drawings, Fig. 1 is a vertical, sectional view of a clay-filled molding die embodying my invention, showing the relation of the top and bottom die members before being brought together to mold a back wall;

Fig. 2 is a similar view showing the position of the die members when brought together; and Fig. 3 is a similar view showing the relation of the die members after the molding operation is completed and the main portion of the top member withdrawn.

The top die member, indicated generally at 10, may be secured to the top plate 11 of a press in the usual manner, as by screws 12, being spaced therefrom by means of spacer-bars 13. The lower mold structure, indicated generally at 14, includes a bottom plate 15 which may rest on and be secured to the lower platen of the press, a vertical enclosure or case 16 and a bottom die member or plate 17 for molding the lower face of the clay piece. Said bottom member 17 is vertically slidable within the case 16, in the usual manner, for ejecting the molded piece, and is attached to an ejector rod 18 passing through an aperture in plate 15.

The upper die member 10 includes a main portion 19 which remains permanently attached to the top press platen 11 by means of the screws 12, and a removable embossing portion 20 fitted within a recess 21 in said portion 19 and rigidly but detachably retained in said recess by means of a vertical pin or stem 22 on the portion 20 passing through a hole 23 in portion 19 and provided with a wedge key 24 which occupies a transverse slot 25 in the pin and rests against the upper side of main portion 19.

The under surface of the removable portion 20 has such a contour as will form the desired ornamental design or picture on the extreme upper corner or shoulder of the work, which may include upwardly and laterally facing embossed portions more or less undercut in relation to the vertical direction of molding pressure, upon the surface of the molded piece, which in a back wall for radiant gas heater is usually formed on a forwardly projecting hood or visor. Said removable portion 20 may be in one or more pieces—a two-piece construction, vertically divided in the middle, being employed when the design is extended to the sides or ends of the molded piece.

The molding operation is performed by filling the case 16 of the lower die structure, over the bottom die plate 17, with loose plastic clay 26 as indicated in Fig. 1, while the upper parts in their assembled condition are retracted, and then operating the press in the usual manner to move the upper die member 10 down into the case 16 and compress the clay to impart the desired form to the molded piece 26ª by squeezing it under heavy pressure between the upper and lower plates and against the lateral molding surfaces of said plates and of the case, as indicated in Fig. 2.

While die member 10 is in its lowest position, the key 24 is withdrawn and the press is operated to retract the main portion 19 of the upper die member, leaving the removable portion 20 in place on the molded piece 26ª as shown in Fig. 3. The ejector rod 18 is then raised to elevate the lower die plate 17, with the work thereon, into the upper part of case 16. The removable die portion 20 may then be stripped from the face of the work, without disturbing the embossed design which it has formed thereon, by pulling it off in an upward slanting direction, transversely of the direction of the molding pressure.

My invention thus provides for rapidly molding in one operation, clay pieces having more or less undercut designs embossed thereon, thus eliminating the usual additional steps formerly required to complete the desired designs by hand. A wide variety of shapes and ornamental designs may be produced and the described details of construction may be variously modified without departing from the scope of the invention as defined in the claims.

I claim:

1. A clay-pressing die comprising members movable toward each other to mold the plastic material between them, one of said members having a removable portion adapted to be left on the molded piece when the remainder of said member is retracted, and detachable from said piece transversely of the direction of molding pressure.

2. A clay-pressing die comprising top and bottom die plates, the top plate including a main portion and a removable embossing portion rigidly supported thereon for molding an undercut lateral face on the work, and detachable fastening means connecting said portions and permitting the main portion to be withdrawn while the removable portion stays on the work until separated therefrom independently of said main portion.

3. A clay-pressing die comprising molding means for forming the top and bottom faces of the work, said means including a member having undercut portions for molding an external corner or shoulder which includes a lateral embossed face of the work, and an adjacent molding portion movable with relation to said member and adapted to be withdrawn from the work to release said member and permit the latter to be independently separated from the work.

4. A clay-pressing die comprising a molding case, molding means therein withdrawable perpendicularly, and an embossing member withdrawable laterally from the work.

5. A clay-pressing die comprising a case and bottom molding plate adapted to be supported on the lower platen of a press, a top shoulder-molding member in the case, withdrawable laterally from the work, a top molding device in the case, withdrawable upwardly from said member and from the work and having means for supporting it from the upper press platen, and a detachable connection between said member and device including a stem and key.

In witness whereof I have hereunto set my hand this 22nd day of July, 1929.

ANDREW P. KELLER.